United States Patent
Wang et al.

(10) Patent No.: US 9,359,213 B2
(45) Date of Patent: Jun. 7, 2016

(54) PLASMA TREATMENT TO STRENGTHEN DIAMONDS

(71) Applicant: The Board of Regents of the Nevada System of Higher Education on Behalf of The University of Las Vegas, Las Vegas, NV (US)

(72) Inventors: Zhiyong Wang, Henderson, NV (US); William Wang, Henderson, NV (US)

(73) Assignee: The Board of Regents of the Nevada System of Higher Education on Behalf of the University of Nevada, Las Vegas, Las Vegas, NV (US)

( * ) Notice: Subject to any disclaimer, the term of this patent is extended or adjusted under 35 U.S.C. 154(b) by 2 days.

(21) Appl. No.: 13/915,385

(22) Filed: Jun. 11, 2013

(65) Prior Publication Data
US 2013/0330265 A1 Dec. 12, 2013

Related U.S. Application Data

(60) Provisional application No. 61/657,971, filed on Jun. 11, 2012.

(51) Int. Cl.
*C01B 31/06* (2006.01)
*C01B 31/00* (2006.01)

(52) U.S. Cl.
CPC ............... *C01B 31/065* (2013.01); *C01B 31/00* (2013.01)

(58) Field of Classification Search
None
See application file for complete search history.

(56) References Cited

U.S. PATENT DOCUMENTS

| | | | | |
|---|---|---|---|---|
| 4,184,079 A | | 1/1980 | Hudson et al. | |
| 4,767,517 A | * | 8/1988 | Hiraki | C23C 14/0605 204/192.15 |
| 4,988,421 A | * | 1/1991 | Drawl et al. | 204/192.3 |
| 5,073,785 A | * | 12/1991 | Jansen | C23C 16/26 347/45 |
| 9,115,443 B2 | * | 8/2015 | Twitchen | C30B 25/105 |
| 2013/0334170 A1 | * | 12/2013 | Englund | C03B 29/04 216/51 |
| 2014/0079921 A1 | * | 3/2014 | De Volder | B82Y 30/00 428/196 |
| 2015/0266741 A1 | * | 9/2015 | Lee | C01B 31/065 432/446 |

OTHER PUBLICATIONS

Rohit Asuri Sudharshana Asuri Sudharshana Chary; Plasma Test on Industrial Diamond Powder in Hydrogen and Air for Fracture Strength Study, a UNLV Theses; Dec. 2012.*
Shirafuji et al.; X-Ray Photoelectron Spectroscopy Analysis of Plasma-Treated Surfaces of Diamond Films; Diamond and Related Materials; 4, pp. 984-988; 1995.*
Kobashi et al.; Fibrous Structures on Diamond and Carbon Surfaes Formed by Hydrogen Plasma Under Direct-Current Bias and Field Electron-Emission Properties; J. Mater. Res., vol. 18, No. 2, Feb. 2003.*

* cited by examiner

*Primary Examiner* — Guinever S Gregorio
(74) *Attorney, Agent, or Firm* — Ballard Spahr LLP

(57) ABSTRACT

The physical properties of a diamond are altered by:
  applying a cationic elemental plasma to a diamond at a plasma temperature of less than 300° C.;
  allowing the cationic plasma to chemically bond with atoms in defects within the diamond; and
  removing the plasma from the diamond.
The cationic elemental plasma may exemplary be selected from the group consisting of as $H^+$, $Na^+$, $Li^+$ and $K^+$. It is preferred that no plasma is projected from a source at the diamond and that the plasma is provided as an environment surrounding the diamond.

18 Claims, 11 Drawing Sheets shows the actual schematic of the system of Figure 1

FIGURE 1
Figure 1A: shows a schematic of a basic plasma generating system.
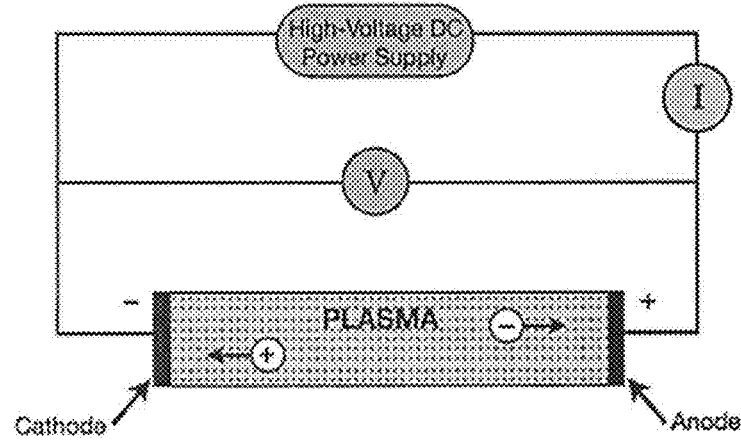
Figure 1B: shows the actual schematic of the system of Figure 1.
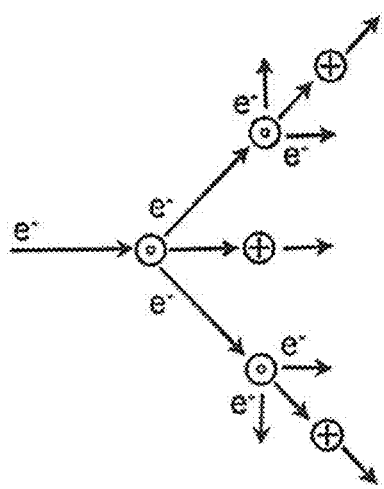

Figure 1C: shows a graph subatomic effects in plasma generation.
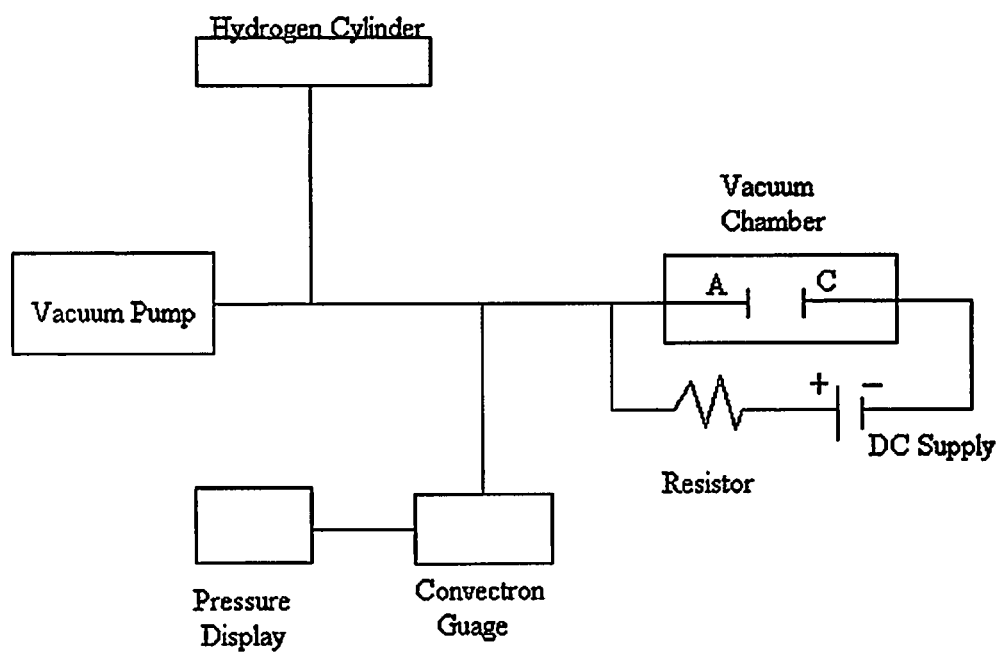

FIGURE 2: Diamond Powder after Plasma with LaB6 Standard
XRD-Rietveld Analysis of Diamond Powder – Plasma-treated Peaks 5, 11, 16 and 23: measurement intensities, others calculated or measured-calculated intensities.
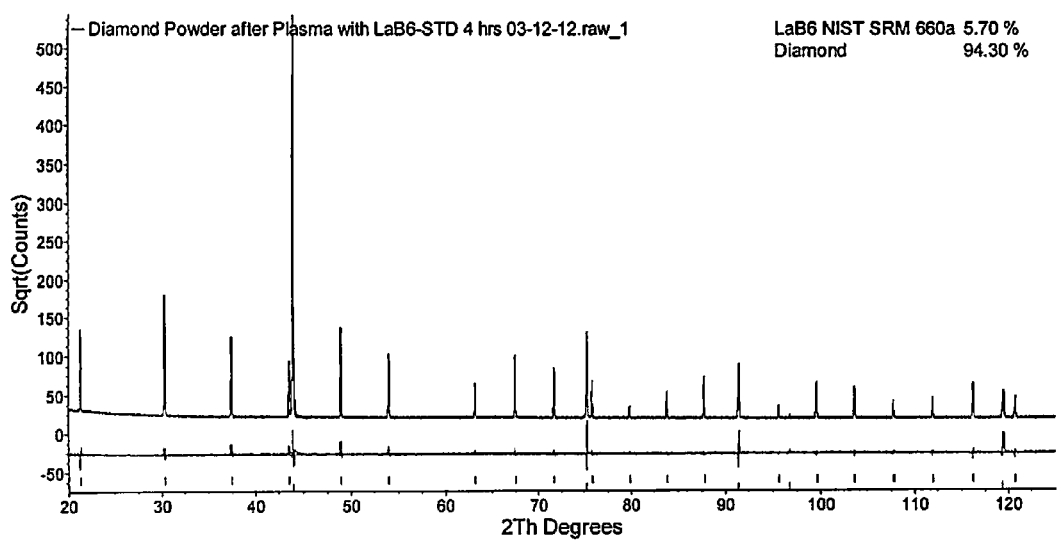

FIGURE 3
Figure 3A: XRD-Rietveld Analysis of Diamond Powder – Plasma-treated
Peaks 1, 3, 7, 10 and 14: measurement intensities, others calculated, or measured-calculated.
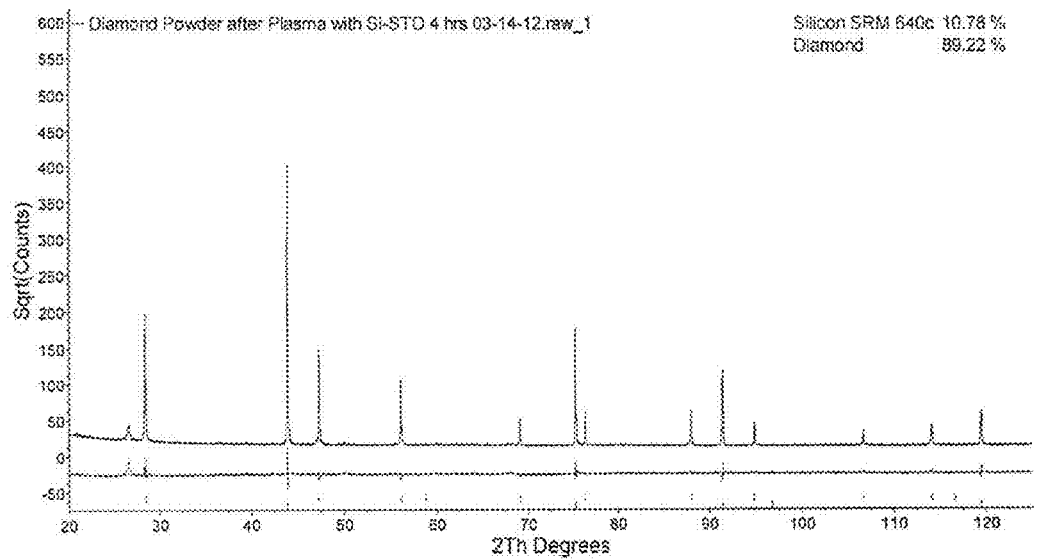
Figure 3B: XRD Rietveld Analysis of Diamond Powder: calculated intensities of the Diamond phase is in peaks 1, 3, 7, 10 and 14.
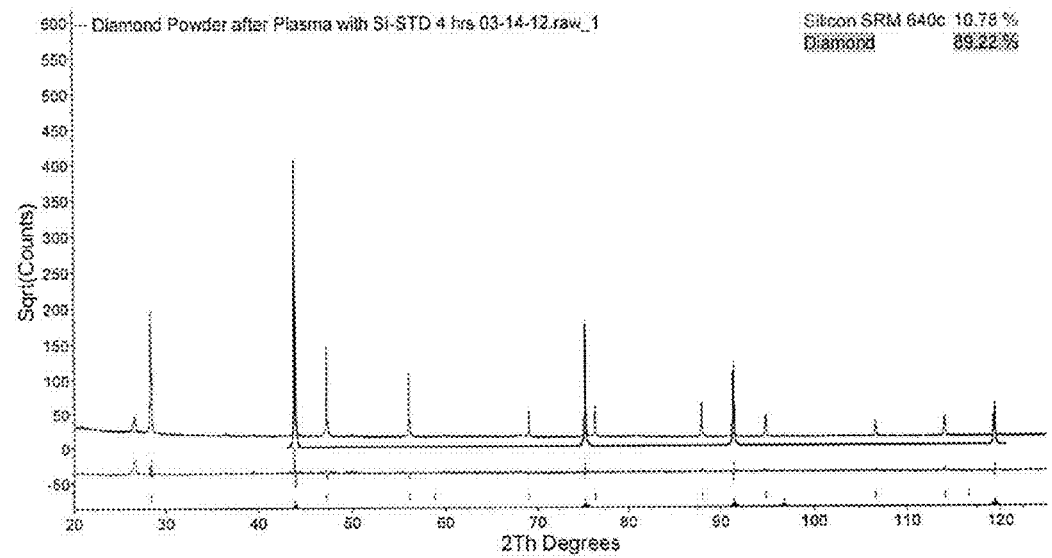

FIGURE 4: XRD Rietveld Analysis of Diamond Powder: calculated intensities of the Diamond phase is highlighted as blue pattern.
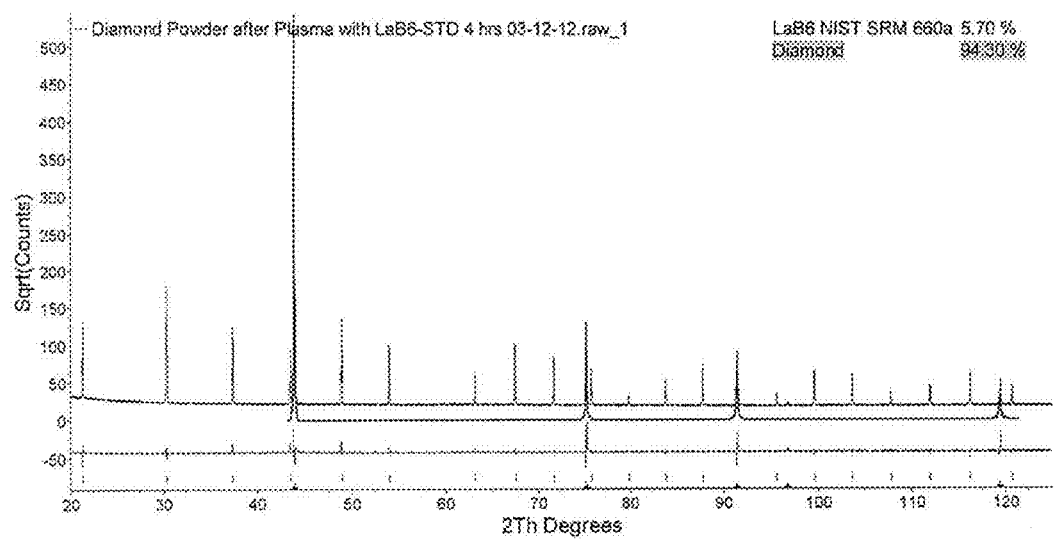

FIGURE 5: Schematic diagram of crushing strength apparatus.
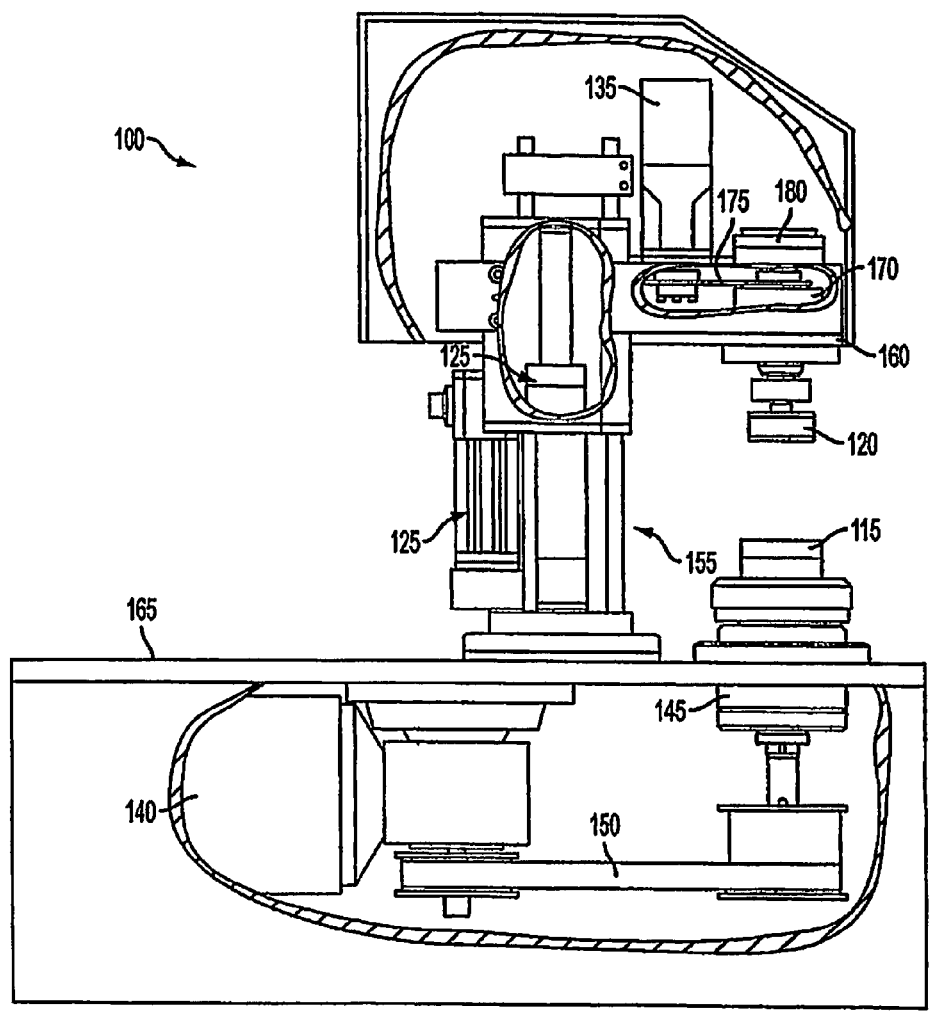

FIGURE 6: shows the base element for the apparatus of Figure 5.
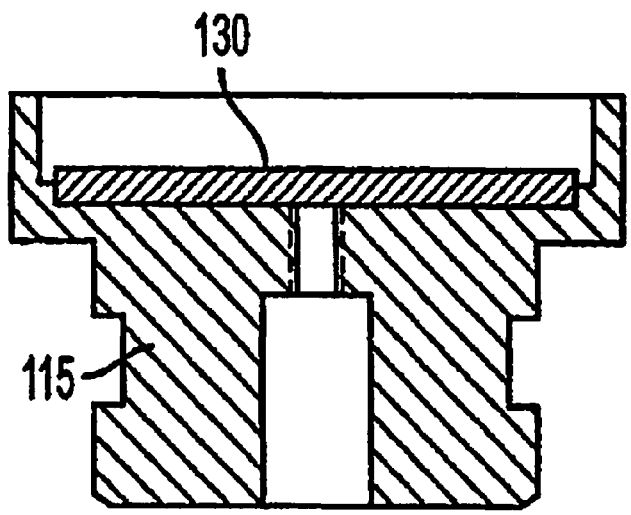
FIGURE 7: is a graphic representation of Particle size distribution for a particular sample.
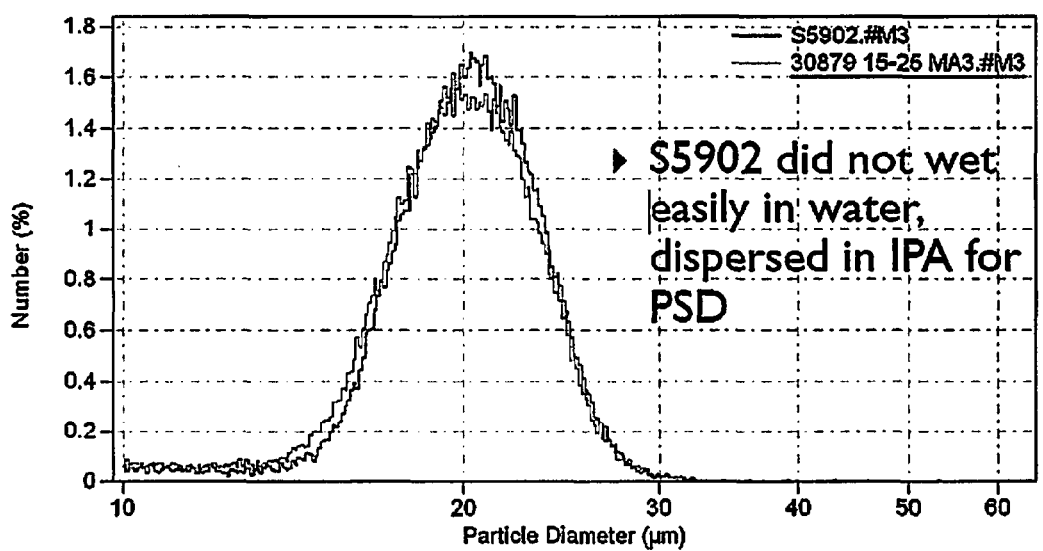

FIG. 8    shows the CSI average for all results from a calendar year. For powder treated by plasma/heat in an attempt to increase crushing strength for 2 samples: 1) Sample designated as S5902, and 2) Sample designated as S5926.
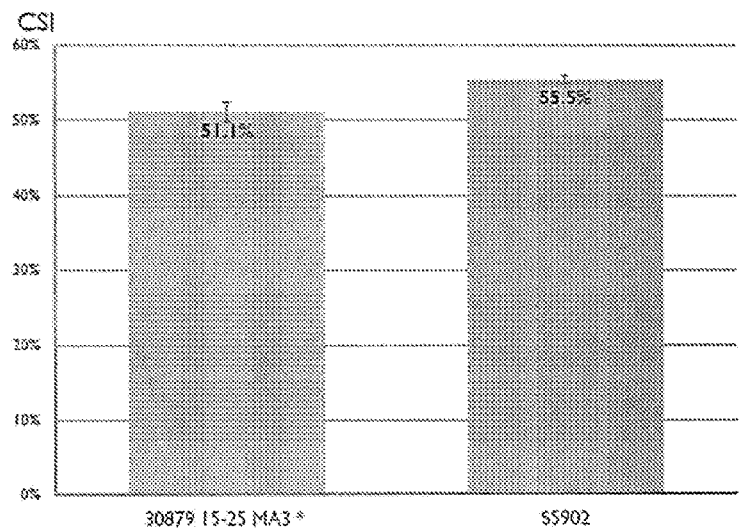
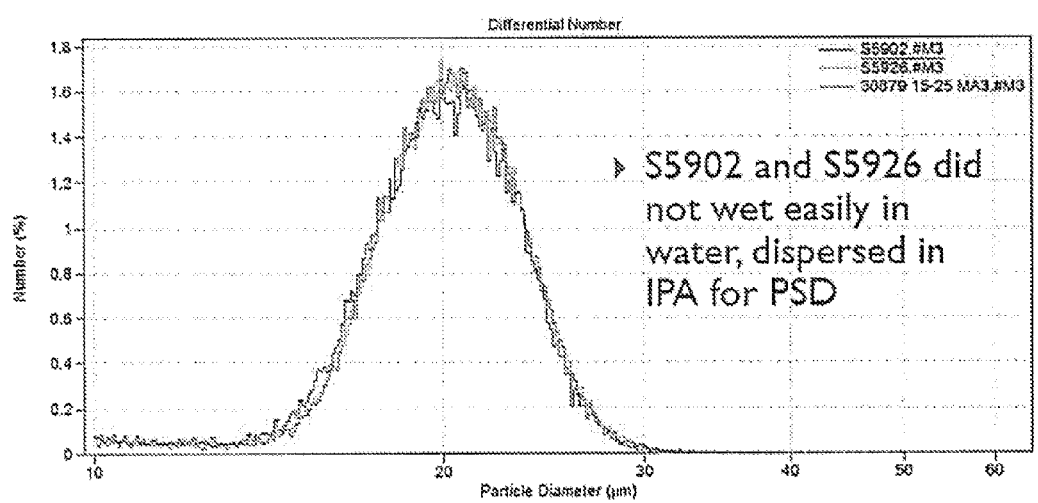

FIGURE 9: shows graphic representation of average testing results for a calendar year for a second sample of treated diamond powder with respect to Crushing Strength Index.
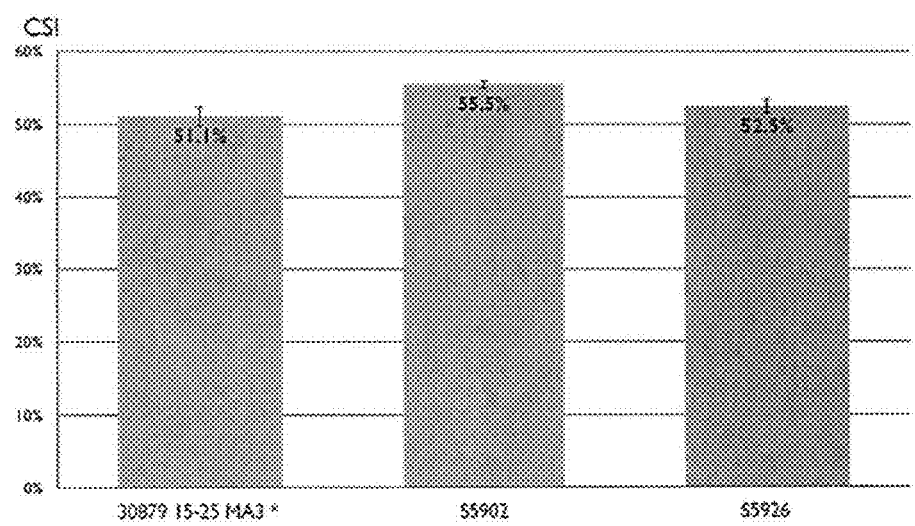

FIGURE 10: Test data on Enhancement of Industrial Diamond Strength

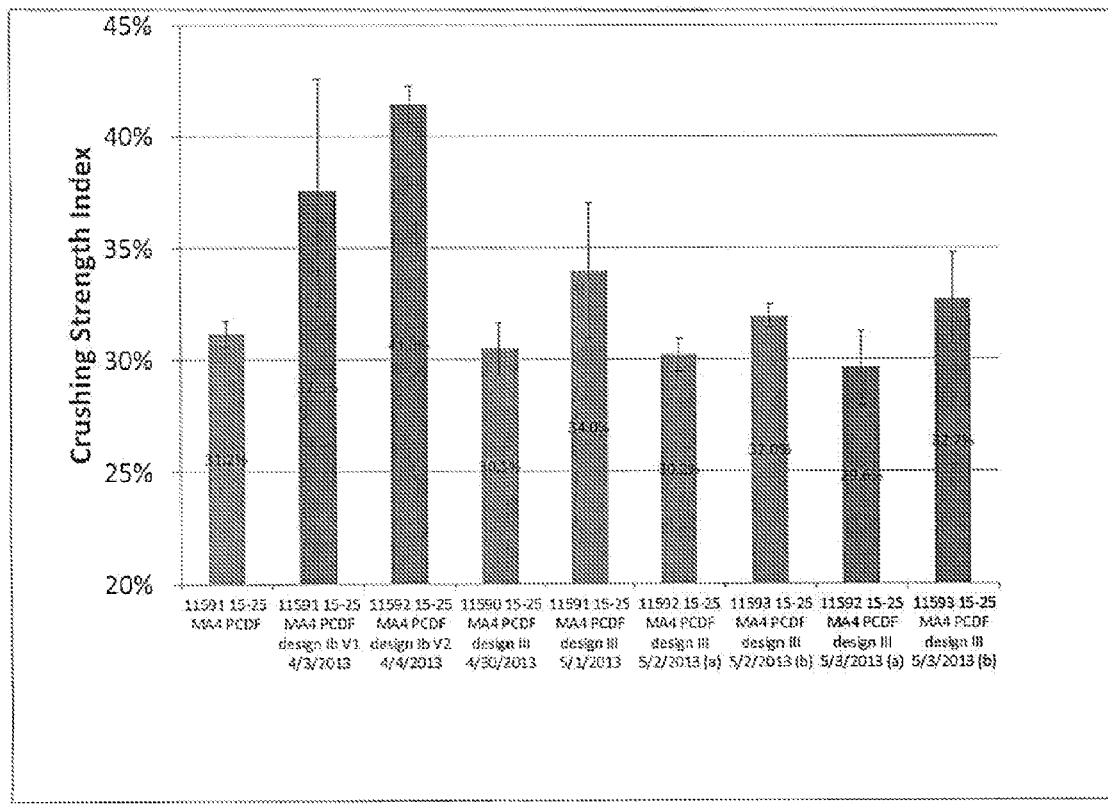

Table 3

| Lot | CSI | | | | |
| --- | --- | --- | --- | --- | --- |
| | trial 1 | trial 2 | trial 3 | average | std dev |
| 11591 15-25 MA4 PCDF | 0.305401 | 0.315854 | 0.315157 | 31.2% | 0.6% |
| 11591 15-25 MA4 PCDF design Ib V1 4/3/2013 | 0.319465 | 0.36893 | 0.417522 | 37.5% | 5.0% |
| 11592 15-25 MA4 PCDF design Ib V2 4/4/2013 | 0.423181 | 0.406801 | 0.413643 | 41.5% | 0.8% |
| 11590 15-25 MA4 PCDF design III 4/30/2013 | 0.306527 | 0.316084 | 0.293004 | 30.5% | 1.2% |
| 11591 15-25 MA4 PCDF design III 5/1/2013 | 0.336298 | 0.371688 | 0.311506 | 34.0% | 3.0% |
| 11592 15-25 MA4 PCDF design III 5/2/2013 (a) | 0.295192 | 0.300962 | 0.310192 | 30.2% | 0.8% |
| 11593 15-25 MA4 PCDF design III 5/2/2013 (b) | 0.325017 | 0.319753 | 0.314946 | 32.0% | 0.5% |
| 11592 15-25 MA4 PCDF design III 5/3/2013 (a) | 0.308383 | 0.30313 | 0.277304 | 29.6% | 1.7% |
| 11593 15-25 MA4 PCDF design III 5/3/2013 (b) | 0.350734 | 0.312369 | 0.319287 | 32.7% | 2.0% |

The bar on far left is untreated diamond sample, the rest were treated at different parameters.

PLASMA TREATMENT TO STRENGTHEN DIAMONDS

RELATED APPLICATION DATA

This application claims priority from U.S. Provisional Patent Application 61/657,971 filed Jun. 11, 2012.

BACKGROUND OF THE INVENTION

1. Field of the Invention

The present invention relates to the treatment of diamonds, the treatment of synthetic or natural diamonds, and the improvement of physical characteristics of diamonds, especially their strength.

2. Background of the Art

It is well known that diamonds are graded by their physical characteristics. Artificial, synthetic and industrial diamonds may be primarily graded on their strength, as many of these types of diamonds are used as abrasive grit, in essentially a powder form where optical properties my not be readily observable, except under microscopic examination. Natural diamonds, especially diamonds used in jewelry and fashion, have many different factors that are used in grading the diamonds, such as color, clarity, occlusion content, shape, and the like.

It would be desirable to be able to inexpensively modify the physical and/or chemical properties of diamonds to increase their worth. Some attempts have been made to provide such processes.

U.S. Pat. No. 4,184,079 (Hudson) describes a process for hardening natural or synthetic diamonds. The process includes steps of at least bombarding the diamond with ions of sufficient energy to penetrate the diamond and to cause irradiation damage in the form of a dislocation network in the crystal structure which inhibits microcleavage of the diamond, said bombardment occurring at a temperature of at least 500° C. such that the diamond crystal structure is maintained during the bombardment. The ions may include Hydrogen cations ($H^+$).

As there are few processes that can measurably improve the properties of diamonds, it would be desirable to find an alternative to the high temperature process of Hudson, where the high temperatures are capable of actually worsening existent flaws in diamonds by strain on the diamond due to thermal expansion and expansion of gases within the diamond flaws, and even by oxidation or other chemical changes in the diamond, especially on its surface.

SUMMARY OF THE INVENTION

A diamond is treated to improve its physical properties by the diamond being within a low temperature (that is defined as less than 300° C., preferably less than 200° C., and more preferably less than 100° C., including 0-70° C., and 15-50° C.) cationic plasma. The plasma preferably comprises low molecular elemental plasma such as $H^+$, $Na^+$, $Li^+$. and $K^+$. The treatment is essentially an immersion of the diamond in the low-temperature plasma environment. The plasma cations penetrate into the diamond material. The small ion with an available reactive bond (because of its positive charge) may bond with the chemical structure in the diamond, particularly where reactive surfaces (along faults, cracks, inclusions, dislocations or occlusions), forming a covalent bond.

BRIEF DESCRIPTION OF THE FIGURE

FIG. 1A: shows a schematic of a basic plasma generating system.
FIG. 1B: shows the actual schematic of the system of FIG. 1.
FIG. 1C: shows a graph subatomic effects in plasma generation.
FIG. 2: A graph of Diamond Powder after Plasma with LaB6 Standard
FIG. 3A: A graph of XRD-Rietveld Analysis of Diamond Powder—Plasma-treated
FIG. 3B: A graph of XRD Rietveld Analysis of Diamond Powder with calculated intensities of the Diamond phase.
FIG. 4: A graph of XRD Rietveld Analysis of Diamond Powder: calculated intensities of the Diamond phase.
FIG. 5: A schematic diagram of crushing strength apparatus.
FIG. 6: shows the base element for the apparatus of FIG. 5.
FIG. 7: is a graphic representation of Particle size distribution for a particular sample.
FIG. 9: shows graphic representation of average testing results for a calendar year for a second sample of treated diamond powder with respect to Crushing Strength Index.
FIG. 10: shows Test data on Enhancement of Industrial Diamond Strength under various conditions and Table 3 providing numeric value for the tests.
FIG. 11 shows Table 3, which provides numeric values for the tests.

DETAILED DESCRIPTION OF THE INVENTION

Figure 8:
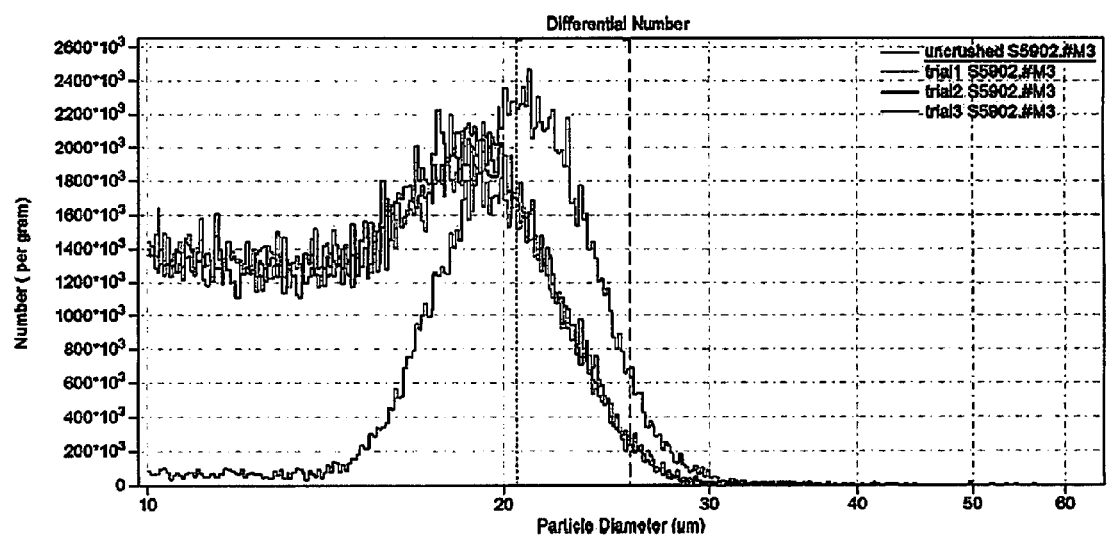
FIG. 8: shows the CSI average for all results from a calendar year.
For Powder treated by plasma/heat in an attempt to increase crushing strength for 2 samples: 1) sample designated as S5902, and 2) sample designated as S5926.

The present technology relates generally to a method of altering physical properties of a diamond. That method may include:
  applying a cationic elemental plasma to a diamond at a relatively low plasma temperature (e.g., less than 400 C and less than 300 C.);
  allowing the cationic plasma to chemically bond with atoms in defects within the diamond; and
  removing the plasma from the diamond.

The cationic elemental plasma may, by way of non-limiting examples, be selected from the group consisting of as $H^+$, $Na^+$, $Li^+$ and $K^+$. In general, no plasma is projected from a source at the diamond, but rather the plasma is provided as an environment surrounding the diamond. It is believed that at least some plasma elemental cations form a covalent bond with carbon in the diamond. It is further believed that at least some plasma elemental cations form a covalent bond with carbon in the diamond and thereby strengthen the diamond. In a preferred embodiment, at least some $H^+$ plasma elemental cations form a covalent bond with carbon in the diamond and thereby strengthen the diamond.

Energy saving capabilities in the practice of the present technology, which also reduce the potential for damage to the diamond include using the plasma is at a temperature below 200° C. or at a temperature below 100° C. It is believed that at least some of the covalent bonds are formed along fault lines, dislocations, occlusions or inclusions within the diamond. The preferred form for working with diamond material is where the diamond is in the form of a powder. In treating a powder batch or continuous supply of powder diamonds, the powder may be vibrated during the treatment with the plasma to effect greater exposure of all surfaces of individual particles.

Plasma is loosely described as an electrically neutral medium of positive and negative particles (i.e. the overall charge of a plasma is roughly zero). It is important to note that although they are unbound, these particles are not 'free'. When the charges move they generate electrical currents with magnetic fields, and as a result, they are affected by each other's fields. This governs their collective behavior with many degrees of freedom. A definition can have three criteria:

1. The plasma approximation: Charged particles must be close enough together that each particle influences many nearby charged particles, rather than just interacting with the closest particle (these collective effects are a distinguishing feature of a plasma). The plasma approximation is valid when the number of charge carriers within the sphere of influence (called the Debye sphere whose radius is the Debye screening length of a particular particle is higher than unity to provide collective behavior of the charged particles. The average number of particles in the Debye sphere is given by the plasma parameter, "Λ".
2. Bulk interactions: The Debye screening length (defined above) is short compared to the physical size of the plasma. This criterion means that interactions in the bulk of the plasma are more important than those at its edges, where boundary effects may take place. When this criterion is satisfied, the plasma is quasi-neutral.
3. Plasma frequency: The electron plasma frequency (measuring plasma oscillations of the electrons) is large compared to the electron-neutral collision frequency (measuring frequency of collisions between electrons and neutral particles). When this condition is valid, electrostatic interactions dominate over the processes of ordinary gas kinetics.

Just like the many uses of plasma, there are several means for its generation, however, one principle is common to all of them: there must be energy input to produce and sustain it. For this case, plasma is generated when an electrical current is applied across a dielectric gas or fluid (an electrically non-conducting material) as can be seen in FIG. 1 (1A and 1B), which shows a discharge tube as a simple example (DC current is used for simplicity). This figure shows a Cascade process of ionization. Electrons are 'e−', neutral atoms 'o', and cations '+'. The potential difference and subsequent electric field pull the bound electrons (negative) toward the anode (positive electrode) while the cathode (negative electrode) pulls the nucleus (in a preferred embodiment, $H^+$). As the voltage increases, the current stresses the material (by electric polarization) beyond its dielectric limit (termed strength) into a stage of electrical breakdown, marked by an electric spark, where the material transforms from being an insulator into a conductor (as it becomes increasingly ionized). This is a stage of avalanching ionization, where collisions between electrons and neutral gas atoms create more ions and electrons (as can be seen in the FIG. 1B). The first impact of an electron on an atom results in one ion and two electrons. Therefore, the number of charged particles increases rapidly (in the millions) only "after about 20 successive sets of collisions", mainly due to a small mean free path (average distance travelled between collisions).

With ample current density and ionization, this forms a luminous electric arc (essentially lightning) between the electrodes. Electrical resistance along the continuous electric arc creates heat, which ionizes more gas molecules (where degree of ionization is determined by temperature), and as per the sequence: solid-liquid-gas-plasma, the gas is gradually turned into a thermal plasma. A thermal plasma is in thermal equilibrium, which is to say that the temperature is relatively homogeneous throughout the heavy particles (i.e. atoms, molecules and ions) and electrons. This is so because when thermal plasmas are generated, electrical energy is given to electrons, which, due to their great mobility and large numbers, are able to disperse it rapidly and by elastic collision (without energy loss) to the heavy particles.

Based on the relative temperatures of the electrons, ions and neutrals, plasmas are classified as "thermal" or "non-thermal". Thermal plasmas have electrons and the heavy particles at the same temperature i.e. they are in thermal equilibrium with each other. Non-thermal plasmas on the other hand have the ions and neutrals at a much lower temperature (normally room temperature) whereas electrons are much "hotter".

Temperature controls the degree of plasma ionization. In particular, plasma ionization is determined by the "electron temperature" relative to the ionization energy (and more weakly by the density) in a relationship called the Saha equation. A plasma is sometimes referred to as being "hot" if it is nearly fully ionized, or "cold" if only a small fraction (for example 1%) of the gas molecules are ionized (but other definitions of the terms "hot plasma" and "cold plasma" are common). This invention is applicable to toughening diamonds, that is, to improvements in the wear resistance and/or hardness of natural or synthetic diamond.

The invention provides, in one aspect, a method of toughening a diamond (preferably a synthetic diamond), comprising treating the diamonds by immersion in a plasma which exposes the diamond with ions of sufficient energy yet at a low temperature to penetrate the diamond and to cause repair of some types of damage in the form of a dislocation, occlusion, inclusion, fault or fracture thereby strengthening the diamond, the method taking place at a relatively low temperature such that the diamond material and structure is not significantly damaged during the treatment.

The species of ion used in the plasma is not critical, although the smaller the cation, the simpler the process and the easier to maintain lower temperatures. Even Nitrogen ions are suitable since it is known that natural diamonds can contain as much as 0.25 percent nitrogen. What is important is the effect the chosen ion has on the diamond in causing repair by bonding. Oxygen is not desirable since it may remove carbon atoms from the diamond. Very heavy ions are also not desirable because at reasonable energies they will have insufficient range to produce a toughened layer of significant depth. The actual number of ions acting on the diamond may be quite small, so that the species actually implanted by the bombardment has no significant effect on other properties of the diamond. It is, however, most convenient to use protons ($H^+$), where the conditions are selected so that the implanted hydrogen has an insignificant effect on the other properties of the diamond, besides hardness and even possibly reduction of visible flaws; protons need only low-cost equipment and achieve relatively large penetrations into the diamond because of their size and mobility, giving deeper toughened layers.

The energy of ions used for bombardment must of course be sufficient to penetrate the diamond adequately. It may for example be in the range of $10^{-4}$ to $10^{-1}$ keV.

The temperature at which the present method is carried out is important from the standpoint of minimizing damage to the diamond. As noted earlier, the Hudson U.S. Patent reference asserted that since ion bombardment of diamond results in the amorphization and softening of the surface, that unless the temperature was held sufficiently high to maintain the crystal structure, for example at a temperature of at least 500° C., the process would not perform its intended results. However, when diamond is subjected to ion bombardment at high temperatures, there is the possibility of the dislocation structure becoming too coarse and also of the diamond beginning to graphitize, thus losing its crystal structure. It is therefore important that this high temperature is not exceeded. The temperature at which diamond graphitizes is dependent on the purity of the diamond and can be established by simple experiment.

To the contrary, in the practice of the present technology, the use of lower temperature plasma is believed to further lessen the potential damage to the diamonds and the functional action of the plasma (i.e., for example in covalently bonding into the diamond materials) is evidenced as being different than the nature of the activity on a molecular or atomic level effected by the Hudson process. In Hudson, even a large atom is used by causing the diamond atoms to vibrate so that openings in the crystal lattice open up to allow larger atom entry to wedge into the open structure. This places the atom into the diamond structure as an interstitial atom.

Applications of the present method include the following: treatment of die surfaces, diamond grit, diamond needles such as styli, micro-hardness indentors and drilling bits. The process is preferred for use with synthetic diamonds, but may be used with natural diamonds. The size of the diamonds treated may also vary along a wide range, from powders or 5 micrometer average diameters up to larger size diamonds, without limit, although maximum average diameters of no more than 2 mm are more amenable to treatment by this process. Also, the present method may be used to treat diamond powder, which may conveniently be treated by a plasma environment with or without vibration to ensure that all surfaces of the powder are treated.

Plasma Examples

Plasma examples are conducted implementing the concept of sputtering. As seen in the previous chapter sputtering technique is the major source of plasma formed due to transfer of electron at high energy. The particles of gas after ionization tend to move close to the electrodes. The electrons move towards anode (positive charge), ions move towards cathode having negative charge. When these fast moving ions are hindered by a substance (diamond in our experiment) they tend to either implant into it causing structural change or reflect off the surface.

Experiment on two different samples. This is to see difference in plasma experiment on each separately. The first experiment was conducted on industrial diamond crystals they were of 21 count. The second sample was from Engis Corporation, Illinois in the form of diamond powder. A total weight of 100 carat with sample size 15-25 micron was imported from the company. The experiment on each sample was repeated for four to five days.

Plasma Example on Diamond Crystals.

Aim

To determine the change in structure of Diamond crystals after plasma treatment.

Apparatus

1) Turble molecule vacuum pump
2) Convectron Gauge (controller and sensor)
3) Tygon tube
4) Experiment chamber or vacuum chamber
5) Hydrogen cylinder
6) DC Voltage source
7) Teflon stand
8) Vacuum Grease
9) Grounding Stick
10) Latex Glove

EXAMPLES

Experimental Setup:

A vacuum pump is connected to a vacuum chamber. The chamber is connected to a Resistor. The Resistor is connected to (e.g., Keithley High DC) DC voltage supply. This particular unit has a maximum voltage of 5000V and maximum 5 mA current. The vacuum pump and chamber are in the series connection. The DC supply and vacuum chamber are connected in parallel. Two connections are drawn between vacuum pump and experiment chamber. The first connection is to a convectron (vacuum pressure) gauge. The gauge is connected to a digital controller which displays the pressure inside the chamber throughout the experiment. The second connection is to a hydrogen cylinder. All the connections are preferably made through Tygon™ tube which supplies hydrogen gas throughout.

The vacuum chamber or experimental chamber is the heart of the experiment. This chamber was designed by the students of UNLV. The setup has a hollow glass tube closed on both sides by plastic plates. Through the Centre of glass tube runs hollow brass tube from both sides connected to aluminum plates on one end.

The aluminum plates act as conductors of voltage supplied. Between the aluminum plates is a Teflon™ polymer stand on which the diamond crystals are placed. Crystals are stuck to the stand in an order of proper rows and columns with the help of vacuum grease FIG. 1: Schematic Diagram of Plasma Connections Procedure:

The crystals are weighed initially. They are then stuck to the stand using vacuum grease. The stand is placed between the cathode and anode plates. They are placed more towards cathode where plasma glow is largely concentrated. The chamber is sealed tight not allowing air to enter through gaps. The vacuum pump is switched on to reduce the amount of air inside the closed chamber. The pump is run continuously for 5-6 hours until the pressure inside is less than 300 mille TORR. After reaching the desired the pressure with the vacuum pump running voltage, hydrogen gas is simultaneously supplied to the chamber. Initial voltage is set to 500 Volts and current supplied 0.15 mA. Plasma is formed inside the chamber between the aluminum plates. The voltage and current are varied accordingly to have continuous plasma. High current can cause arching effect on the glass plastic which can melt the plastic cylinder down if run for long hours. Thus a continuous check should be done throughout the experiment. The diamond crystals should be in plasma for 6-7 hours. The current is grounded in the chamber before touching by a grounding stick to avoid current shock. The diamond crystals are then collected in a bag for XRD test.

The crystals are arranged in the order of rows and columns. This arrangement is easier to pick the four diamond crystals which were close to cathode. This concluded the first day of experiment. The same procedure is repeated for additional days which yielded more crystals closer to cathode. Care should be taken not to touch the Teflon™ polymer stand with bare hands as finger prints and dirt on it may not give the required results. Latex gloves should be worn while placing or removing the crystals.

The variations in current, pressure and voltage during the experiment each day is recorded in tables.

TABLE 1

Day 1

| Time | Voltage (V) | Current (mA) | Pressure (milliTORR) |
|---|---|---|---|
| 10-11 AM | 470 | 0.21 | 84 |
| 11 AM-12 PM | 470 | 0.27 | 120 |
| 12-1 PM | 470 | 0.4 | 132 |
| 1-2 PM | 470 | 0.05 | 140 |
| 2-3 PM | 470 | 0.055 | 150 |
| 3-4 PM | 470 | 0.06 | 180 |
| 4-5 PM | 470 | 0.085 | 206 |

TABLE 2

Day 2

| Time | Voltage (V) | Current (mA) | Pressure (milliTORR) |
|---|---|---|---|
| 9-10 AM | 500 | 0.05 | 150 |
| 10-11 AM | 470 | 0.055 | 160 |
| 11 AM-12 PM | 480 | 0.055 | 163 |
| 12-1 PM | 480 | 0.06 | 170 |
| 1-2 PM | 480 | 0.06 | 176 |
| 2-3 PM | 490 | 0.07 | 181 |
| 3-4 PM | 500 | 0.072 | 185 |
| 4-5 PM | 500 | 0.07 | 176 |

TABLE 3

Day 3

| Time | Voltage (V) | Current (mA) | Pressure (milliTORR) |
|---|---|---|---|
| 9-10 AM | 480 | 0.05 | 246 |
| 10-11 AM | 480 | 0.052 | 250 |
| 11 AM-12 PM | 480 | 0.045 | 230 |
| 12-1 PM | 490 | 0.045 | 235 |
| 1-2 PM | 480 | 0.037 | 220 |
| 2-3 PM | 480 | 0.052 | 240 |
| 3-4 PM | 480 | 0.057 | 265 |
| 4-5 PM | 480 | 0.050 | 250 |

TABLE 4

Day 4

| Time | Voltage (V) | Current (mA) | Pressure (milliTORR) |
|---|---|---|---|
| 9-10 AM | 470 | 0.15 | 290 |
| 10-11 AM | 475 | 0.2 | 320 |
| 11 AM-12 PM | 470 | 0.1 | 280 |
| 12-1 PM | 470 | 0.095 | 260 |
| 1-2 PM | 470 | 0.095 | 253 |
| 2-3 PM | 472 | 0.1 | 279 |
| 3-4 PM | 470 | 0.1 | 270 |
| 4-5 PM | 470 | 0.1 | 265 |

TABLE 5

Day 5

| Time | Voltage (V) | Current (mA) | Pressure (milliTORR) |
|---|---|---|---|
| 9-10 AM | 510 | 0.08 | 248 |
| 10-11 AM | 510 | 0.06 | 290 |
| 11 AM-12 PM | 510 | 0.07 | 270 |
| 12-1 PM | 510 | 0.07 | 265 |
| 1-2 PM | 510 | 0.065 | 252 |
| 2-3 PM | 510 | 0.065 | 240 |
| 3-4 PM | 510 | 0.05 | 210 |
| 4-5 PM | 515 | 0.052 | 230 |

TABLE 6

Weights after experiment

| Diamond sample | Weight of sample after each day experiment in grams(gm) | | | | |
|---|---|---|---|---|---|
| | Day 1 | Day 2 | Day 3 | Day 4 | Day 5 |
| 1 | 0.0054 | | | | |
| 2 | 0.0050 | | | | |
| 3 | 0.0051 | | | | |
| 4 | 0.0042 | | | | |
| 5 | 0.0051 | 0.0050 | | | |
| 6 | 0.0054 | 0.0054 | 0.0054 | | |
| 7 | 0.0062 | 0.0062 | 0.0063 | 0.0063 | |
| 8 | 0.0068 | 0.0068 | 0.0068 | 0.0069 | 0.0067 |
| 9 | 0.0083 | 0.0083 | | | |
| 10 | 0.0067 | 0.0067 | 0.0067 | | |
| 11 | 0.0038 | 0.0037 | 0.0037 | 0.0037 | |
| 12 | 0.0042 | 0.0042 | 0.0043 | 0.0042 | 0.0040 |
| 13 | 0.0050 | 0.0050 | | | |
| 14 | 0.0045 | 0.0044 | 0.0044 | | |
| 15 | 0.0039 | 0.0040 | 0.0040 | 0.0041 | |
| 16 | 0.0055 | 0.0057 | 0.0057 | 0.0058 | 0.0056 |
| 17 | 0.0057 | 0.0058 | | | |
| 18 | 0.0080 | 0.0080 | 0.0079 | | |
| 19 | 0.0089 | 0.0089 | 0.0089 | 0.0088 | |
| 20 | 0.0057 | 0.0057 | 0.0057 | 0.0057 | 0.0056 |
| 21 | 0.0052 | 0.0053 | 0.0054 | 0.0053 | 0.0053 |

Result:

The crystals after each day experiment were taken to be weight check using a physical balance shown in Table 6. The plasma was imposed on the sample for hours had no change on the atoms which can be seen from the table below showing no change in weight of the crystals. These were then removed for XRD test.

Plasma Experiment on Diamond Powder

A plasma test on diamond powder was conducted on two different samples. The first sample weighed 10 carats. Second sample weighed 15 carats.

Aim

To determine the change in structure of Diamond powder after plasma treatment.

Apparatus
1) Turble molecule vacuum pump
2) Convectron gauge (controller and sensor)
3) Tygon tube
4) Experimental chamber
5) Hydrogen cylinder
6) DC Voltage source
7) Hollow plastic cylinder.
8) Vacuum Grease
9) Grounding stick
10) Latex Glove Experimental Setup A Vacuum pump is connected to vacuum chamber. The chamber is connected to a Resistor. The Resistor is connected to, again for example, a Keithley High DC voltage supply. Vacuum pump and chamber are in series connection. DC supply and vacuum chamber are connected in parallel.

Two connections are drawn between vacuum pump and experiment chamber. The first connection is to a Convectron gauge. The gauge is connected to a digital controller which displays the pressure inside the chamber throughout the experiment. The second connection is to hydrogen cylinder. All the connections are made through Tygon™ tube which supplies hydrogen gas throughout.

The sample used here is in powder form as compared to the previous experiment. Since the experiment is done in vacuum care has to be taken that the sample doesn't get sucked by the vacuum pump. Thus a box has to be built which prevents sample from being blown off in the same time allows plasma to pass through it. Many options were considered before getting the right box.

The first sample holder made was a hollow container plastic box with aluminum plate on one end, other end covered by filter paper to allow air to be absorbed. This was of limited utility as the pressure inside the chamber didn't drop below 2 TORR after suction. The filter paper was replaced by a 5 micron sieve. The sieve was too costly. The container plastic oozed gases which were hard to remove. It was conceived to use a hard plastic box tightly fitted between the electrode plates. Air still remained entrapped, not allowing plasma to form. Holes were punched on the surface to allow air suction. Placing an aluminum base in the box allowed easy placement of the sample between the electrodes. The aluminum plate on the base did not allow the plasma to be formed inside, as the plasma was formed to the sides on the electrodes. The final setup without aluminum base proved to be best.

Any burrs on the electrode plates created a lot of arching in plasma. These have to be sanded down regularly for a smooth finish to have a good plasma glow. As the diamond powder is a very fine grained size, care has to be taken to not lose them.

Experiment Procedure

Diamond powder is weighed on a physical for close to 2 gms (10 carat). Two portions of 10 carats are put in two separate bags. One bag is used for plasma experiment. The powder was carefully placed on the cathode plate before covering it with the plastic box such that the sample is inside the box. This was to be covered by the plastic cylinder along with sealing the chamber prevent air flow. The vacuum pump is switched on and left running until the pressure dropped to around 250 milli TORR. Keeping the pump switched on, hydrogen is purged into the chamber along with DC current. The current bombards the hydrogen changing it to plasma. This is continued for 4-8 hours for 3 days before taking out the crystals for XRD Test.

The tables below are the parameter values for first sample of 10 carats.

TABLE 7

Day 1

| Time | Voltage (V) | Current (mA) | Pressure (milliTORR) |
|---|---|---|---|
| 9-10 AM | 700 | 0.08 | 208 |
| 10-11 AM | 700 | 0.15 | 360 |
| 11 AM-12 PM | 750 | 0.15 | 360 |
| 12-1 PM | 800 | 0.1 | 350 |
| 1-2 PM | 775 | 0.095 | 330 |
| 2-3 PM | 650 | 0.09 | 290 |
| 3-4 PM | 725 | 0.1 | 360 |
| 4-5 PM | 700 | 0.09 | 354 |

TABLE 8

Day 2

| Time | Voltage (V) | Current (mA) | Pressure (milliTORR) |
|---|---|---|---|
| 9-10 AM | 650 | 1.5 | 280 |
| 10-11 AM | 660 | 1.7 | 310 |
| 11 AM-12 PM | 660 | 1.7 | 315 |
| 12-1 PM | 700 | 1.9 | 348 |
| 1-2 PM | 660 | 1.8 | 346 |
| 2-3 PM | 680 | 1.8 | 330 |
| 3-4 PM | 680 | 1.8 | 325 |
| 4-5 PM | 680 | 1.7 | 320 |

TABLE 9

Day 3

| Time | Voltage (V) | Current (mA) | Pressure (milliTORR) |
|---|---|---|---|
| 9-10 AM | 630 | 2 | 270 |
| 10-11 AM | 640 | 3 | 350 |
| 11 AM-12 PM | 660 | 3 | 340 |
| 12-1 PM | 700 | 3 | 327 |
| 1-2 PM | 660 | 3 | 370 |
| 2-3 PM | 670 | 2.6 | 366 |
| 3-4 PM | 680 | 2.5 | 361 |
| 4-5 PM | 680 | 2.5 | 360 |

The tables below are parameter values for second sample of 15 carat.

TABLE 10

Test 2-Day 1

| Time | Voltage (V) | Current (mA) | Pressure (milliTORR) |
|---|---|---|---|
| 9-10 AM | 650 | 2 | 248 |
| 10-11 AM | 660 | 3 | 353 |
| 11 AM-12 PM | 660 | 3 | 338 |
| 12-1 PM | 700 | 3 | 327 |
| 1-2 PM | 670 | 2.7 | 371 |
| 2-3 PM | 670 | 2.6 | 364 |
| 3-4 PM | 680 | 2.6 | 362 |
| 4-5 PM | 680 | 2.5 | 359 |

TABLE 11

Day 2-Test 2

| Time | Voltage (V) | Current (mA) | Pressure (milliTORR) |
|---|---|---|---|
| 9-10 AM | 650 | 1.8 | 241 |
| 10-11 AM | 660 | 2 | 305 |
| 11 AM-12 PM | 660 | 3 | 347 |
| 12-1 PM | 700 | 3 | 357 |
| 1-2 PM | 670 | 3.2 | 371 |
| 2-3 PM | 670 | 2.6 | 364 |
| 3-4 PM | 680 | 2.6 | 362 |
| 4-5 PM | 680 | 2.5 | 359 |

TABLE 12

Day 2-Test 3*

| Time | Voltage (V) | Current (mA) | Pressure (milliTORR) |
|---|---|---|---|
| 10-11 AM | 700 | 2.5 | 320 |

*Test was abandoned due to running out of hydrogen gas

Test Results

As seen in the previous example, diamond powder was separated as two 10 carat samples. One was used for plasma test the other was used for XRD before plasma.
A Graph Comparison of the XRD Result Before Plasma Treatment and after Plasma Treatment are Shown in FIGS. 2A and 2B:

Analytical Details:
The lattice parameter was refined to 3.567507(9) Å. A texture model (111) was applied.
Range Number: 1
R-Values

| | | | |
|---|---|---|---|
| Rexp: 4.34 | Rwp: 11.61 | Rp: 7.88 | GOF: 2.67 |
| Rexp': 5.70 | Rwp': 15.24 | Rp': 12.77 | DW: 0.34 |

Quantitative Analysis - Rietveld

| | |
|---|---|
| Phase 1: Diamond | 90.811(55)% |
| Phase 2: "Silicon SRM 640c" | 9.189(55)% |

Background

| | |
|---|---|
| Chebychev polynomial, Coefficient 0 | 271.49(53) |
| 1 | −228.35(98) |
| 2 | 155.58(84) |
| 3 | −94.68(79) |
| 4 | 59.79(62) |
| 5 | −32.34(57) |

Instrument

| | |
|---|---|
| Primary radius (mm) | 435 |
| Secondary radius (mm) | 435 |
| Linear PSD 2Th angular range (°) | 3 |
| FDS angle (°) | 1 |

Full Axial Convolution

| | |
|---|---|
| Filament length (mm) | 12 |
| Sample length (mm) | 15 |
| Receiving Slit length (mm) | 12 |
| Primary Sollers (°) | 2.3 |
| Secondary Sollers (°) | 2.5 |

Corrections

| | |
|---|---|
| Zero error | −0.019(16) |
| Specimen displacement | −0.280(65) |
| LP Factor | 27.3 |

Structure 1

| | |
|---|---|
| Phase name | Diamond |
| R-Bragg | 1.831 |
| Spacegroup | Fd-3mS |
| Scale | 0.2994(11) |
| Cell Mass | 96.088 |
| Cell Volume (Å^3) | 45.40404(35) |
| Wt % - Rietveld | 90.811(55) |

Crystallite Size

| | |
|---|---|
| Cry size Lorentzian (nm) | 1255819435000.0(27) |

Strain

| | |
|---|---|
| Strain L | 0.00097(53) |
| Strain G | 0.08713(82) |
| Crystal Linear Absorption Coeff. (1/cm) | 15.89589(12) |
| Crystal Density (g/cm^3) | 3.514195(27) |
| Preferred Orientation (Dir 1: 111) | 0.42546(58) |

PVII peak type $FWHM = a + b/Cos(Th) + c\,Tan(Th)$

| | |
|---|---|
| a | 0.0047(75) |
| b | 0.0069(88) |
| c | 0.0001(49) |

Exponent $m = 0.6 + ma + mb/Cos(Th) + mc/Tan(Th)$

| | |
|---|---|
| ma | 0.21(26) |
| mb | 0.18(16) |
| mc | 0.144(35) |

-continued

| Lattice parameters | |
|---|---|
| a (Å) | 3.5675070(92) |

| Site | Np | x | y | z | Atom | Occ | Beq |
|---|---|---|---|---|---|---|---|
| C1 | 8 | 0.00000 | 0.00000 | 0.00000 | C | 1 | 1 |

Structure 2

| | |
|---|---|
| Phase name | Silicon SRM 640c |
| R-Bragg | 11.837 |
| Spacegroup | Fd-3mS |
| Scale | 0.003672(20) |
| Cell Mass | 224.683 |
| Cell Volume (Å^3) | 160.20870 |
| Wt % - Rietveld | 9.189(55) |
| Crystallite Size | |
| Cry size Lorentzian (nm) | 1612(86) |
| Strain | |
| Strain L | 0.017(17) |
| Strain G | 0.031(99) |
| Crystal Linear Absorption Coeff. (1/cm) | 148.913 |
| Crystal Density (g/cm^3) | 2.329 |
| PVII peak type | |
| FWHM = a + b/Cos(Th) + c Tan(Th) | |
| a | 0.016(13) |
| b | 0.008(14) |
| c | 0.0001(69) |
| Exponent m = 0.6 + ma + mb/Cos(Th) + mc/Tan(Th) | |
| ma | 20(630) |
| mb | 5(470) |
| mc | 5(56) |
| Lattice parameters | |
| a (Å) | 5.4311946 |

| Site | Np | x | y | z | Atom | Occ | Beq |
|---|---|---|---|---|---|---|---|
| Si1 | 8 | 0.00000 | 0.00000 | 0.00000 | Si | 1 | 3.402(33) |

XRD Test Result after Plasma:

Two tests were conducted using different standards. The first was using LaB6 standard and is shown in FIG. 3. Data on these Examples Represented in these Examples and Figures Also Includes the Following Information on Diamond Powder after Plasma with LaB6-STD 4 Hrs 03-12-12.raw.

| Range Number: 1 | | | |
|---|---|---|---|
| R-Values | | | |
| Rexp: 3.52 | Rwp: 13.79 | Rp: 7.84 | GOF: 3.91 |
| Rexp': 5.45 | Rwp': 21.32 | Rp': 16.95 | DW: 0.18 |
| Quantitative Analysis - Rietveld | | | |
| Phase 1: Diamond | | 94.302(50)% | |
| Phase 2: "LaB6 NIST SRM 660a" | | 5.698(50)% | |
| Background | | | |
| Chebychev polynomial, Coefficient 0 | | 492.2(10) | |
| 1 | | −222.6(18) | |
| 2 | | 123.1(16) | |
| 3 | | −61.2(15) | |
| 4 | | 46.2(13) | |
| 5 | | −28.6(12) | |
| Instrument | | | |
| Primary radius (mm) | | 435 | |
| Secondary radius (mm) | | 435 | |
| Linear PSD 2Th angular range (°) | | 3 | |
| FDS angle (°) | | 1 | |

-continued

| Full Axial Convolution | |
|---|---|
| Filament length (mm) | 12 |
| Sample length (mm) | 15 |
| Receiving Slit length (mm) | 12 |
| Primary Sollers (°) | 2.3 |
| Secondary Sollers (°) | 2.5 |
| Corrections | |
| Zero error | 0.004(59) |
| Specimen displacement | 0.02(21) |
| LP Factor | 27.3 |

Structure 1

| | |
|---|---|
| Phase name | Diamond |
| R-Bragg | 2.644 |
| Spacegroup | Fd-3mS |
| Scale | 0.2137(18) |
| Cell Mass | 96.088 |
| Cell Volume (Å^3) | 45.4467(10) |
| Wt % - Rietveld | 94.302(50) |
| Crystallite Size | |
| Cry size Lorentzian (nm) | 1250(400) |
| Strain | |
| Strain L | 0.0013(62) |
| Strain G | 0.1078(21) |
| Crystal Linear Absorption Coeff. (1/cm) | 15.88095(36) |
| Crystal Density (g/cm^3) | 3.510893(79) |
| Preferred Orientation (Dir 1: 111) | 0.3895(12) |
| PVII peak type | |
| FWHM = a + b/Cos(Th) + c Tan(Th) | |
| a | 0.001(18) |
| b | 0.004(20) |
| c | 0.000(11) |
| Exponent m = 0.6 + ma + mb/Cos(Th) + mc/Tan(Th) | |
| ma | 0.14(51) |
| mb | 0.07(31) |
| mc | 0.163(82) |
| Lattice parameters | |
| a (Å) | 3.568625(27) |

| Site | Np | x | y | z | Atom | Occ | Beq |
|---|---|---|---|---|---|---|---|
| C1 | 8 | 0.00000 | 0.00000 | 0.00000 | C | 1 | 1 |

Structure 2

| | |
|---|---|
| Phase name | LaB6 NIST SRM 660a |
| R-Bragg | 7.855 |
| Spacegroup | Pm-3m |
| Scale | 0.003852(15) |
| Cell Mass | 203.778 |
| Cell Volume (Å^3) | 71.8462(18) |
| Wt % - Rietveld | 5.698(50) |
| Crystallite Size | |
| Cry size Lorentzian (nm) | 1530(230) |
| Strain | |
| Strain L | 0.0104(22) |
| Strain G | 0.0276(85) |
| Crystal Linear Absorption Coeff. (1/cm) | 1124.459(28) |
| Crystal Density (g/cm^3) | 4.70980(12) |
| PVII peak type | |
| FWHM = a + b/Cos(Th) + c Tan(Th) | |
| a | 0.0102(73) |
| b | 0.0125(85) |
| c | 0.0001(51) |
| Exponent m = 0.6 + ma + mb/Cos(Th) + mc/Tan(Th) | |
| ma | 20(360) |
| mb | 5(230) |
| mc | 5(52) |

-continued

Lattice parameters a (Å)                4.157203(35)

| Site | Np | x | y | z | Atom | Occ | Beq |
|------|----|----|----|----|------|-----|-----|
| La1 | 1 | 0.00000 | 0.00000 | 0.00000 | La + 3 | 1 | 0.568(94) |
| B1 | 6 | 0.19750 | 0.50000 | 0.50000 | B | 1 | 0.05(15) |

A Graph Comparison of the XRD Result Before Plasma Treatment and after Plasma Treatment are Shown in FIGS. 3A and 3B:

XRD Test Result with Si standard
Diamond Powder after Plasma with Silicon Standard (Sample II) in FIGS. 3A and 3B
File 1: "C:\My Documents 2012\XRD data 2012\Wang\Diamond Powder after Plasma with Si-STD 4 hrs 03-14-12.raw"
Range Number: 1
R-Values

| Rexp: 4.39 | Rwp: 14.08 | Rp: 10.11 | GOF: 3.21 |
|---|---|---|---|
| Rexp': 6.35 | Rwp': 20.36 | Rp': 19.09 | DW: 0.25 |

Quantitative Analysis - Rietveld

| Phase 1: Diamond | 89.22(19)% |
|---|---|
| Phase 2: "Silicon SRM 640c" | 10.78(19)% |

Background

| Chebychev polynomial, Coefficient 0 | 316.74(68) |
|---|---|
| 1 | −248.8(13) |
| 2 | 159.3(11) |
| 3 | −93.6(10) |
| 4 | 57.09(80) |
| 5 | −28.89(75) |

Instrument

| Primary radius (mm) | 435 |
|---|---|
| Secondary radius (mm) | 435 |
| Linear PSD 2Th angular range (°) | 3 |
| FDS angle (°) | 1 |

Full Axial Convolution

| Filament length (mm) | 12 |
|---|---|
| Sample length (mm) | 15 |
| Receiving Slit length (mm) | 12 |
| Primary Sollers (°) | 2.3 |
| Secondary Sollers (°) | 2.5 |

Corrections

| Zero error | −0.004(21) |
|---|---|
| Specimen displacement | 0.003(83) |
| LP Factor | 27.3 |

Structure 1

| Phase name | Diamond |
|---|---|
| R-Bragg | 2.885 |
| Spacegroup | Fd-3mS |
| Scale | 0.3648(69) |
| Cell Mass | 96.088 |
| Cell Volume (Å^3) | 45.40192(57) |
| Wt % - Rietveld | 89.22(19) |

Crystallite Size

| Cry size Lorentzian (nm) | 1620(310) |
|---|---|

Strain

| Strain L | 0.0002(25) |
|---|---|
| Strain G | 0.0700(21) |
| Crystal Linear Absorption Coeff. (1/cm) | 15.89663(20) |
| Crystal Density (g/cm^3) | 3.514359(44) |
| Preferred Orientation (Dir 1: 111) | 0.5980(40) |

-continued

PVII peak type

FWHM = a + b/Cos(Th) + c Tan(Th)
a                                           0.0083(70)
b                                           0.0095(82)
c                                           0.0010(47)
Exponent m = 0.6 + ma + mb/Cos(Th) + mc/Tan(Th)
ma                                          0.38(45)
mb                                          0.36(30)
mc                                          0.114(60)
Lattice parameters a (Å)                                       3.567452(15)

Site  Np   x         y         z         Atom  Occ  Beq
C1    8    0.00000   0.00000   0.00000   C     1    1.084(57)

Structure 2

| Phase name | Silicon SRM 640c |
|---|---|
| R-Bragg | 8.902 |
| Space group | Fd-3mS |
| Scale | 0.005340(28) |
| Cell Mass | 224.683 |
| Cell Volume (A^3) | 160.2087 |
| Wt % - Rietveld | 10.78(19) |
| Crystallite Size | Cry size Lorentzian (nm) |
|  | 398(24) |

Strain

Strain L                                    0.0139(36)
Strain G                                    00404(44)
Crystal Linear Absorption Coeff. (1/cm)     148.913
Crystal Density (g/cm^3)                    2.329
PVII peak type FWHM = a + b/Cos(Th) + c Tan(Th)
a                                           0.020(14)
b                                           0.004(16)
c                                           0.0001(80)
Exponent m = 0.6 + ma + mb/Cos(Th) + mc/Tan(Th)
ma                                          20(580)
mb                                          5(490)
mc                                          0(30)
Lattice parameters a (Å)                                       5.4311946

Site  Np   x         y         z         Atom  Occ  Beq
Si1   8    0.00000   0.00000   0.00000   Si    1    2.663(30)

Crushing Strength

The diamond powder sample after XRD was tested for Particle Size Distribution (PSD) and Crushing Strength Index (CSI).

The properties of mechanical strength and fracture mechanism determine the characteristics and performance of the crystal as abrasive. As the crystals are used in various operations like grinding, polishing and lapping, they must be suitable to be used in the required application. Defects in the crystal can lead to easy and early wear of tool. This is due to high stresses caused during operation which may lead to damage of work piece. The crystal powder fracture strength is determined by applying the similar conditions during process. Lapping is the most common application of diamond tool whose abrasive diameter is between 5 to 40 microns.

This has led to inventing a machine for crushing strength of micron super abrasive materials as shown in FIG. 5.

The machine of FIG. 5 uses kinematics of lapping to determine the crushing strength for particles with diameter as low as 10 microns. The testing machine comprised of steel cup 115 and steel piston 120 rotating independently by gear motors 135, 140 measured in RPM. The motors move in opposite direction with maximum speed of 200 RPM. Linear actuator 125, with pneumatic or hydraulic cylinder, is connected to piston 120 to apply the desired load to the cup. The cup is connected to spindle 145 which is connected to gear motor 140 by a belt 150. The piston is coupled to spindle 170, which is connected to gear motor 135 by chain 175. Gear motor 135 is mounted on anti-rotational assembly 155. Linear actuator 125, piston, and anti-rotational assembly are all fixed to platform 160. Cup, spindle 145, gear motor 140 and anti-rotational assembly are supported by base 165.

From FIG. 5, both piston and base cup metal are lined by polycrystalline diamond compact (PCD) disc 130 supported on a base 115 as shown in FIG. 6. This is to prevent the eroded steel parts from contaminating the powder sample and to ensure precise test results.

The sample powder is evenly distributed over the surface of PCD disc. Piston 120 is lowered into the cup 115 such that it touches the abrasive powder, pushing the load transfer rod 190. This pressed the load cell 180 causing Ito produce a signal. The signal is sent to actuator 125 to produce the preset force for crushing. After numerous experiments, for particles below 40 microns rotation is at 10 RPM with a load of 13.4 lbs. As the load is evenly applied on the abrasive powder, cup and piston are rotated simultaneously in opposite direction at the necessary speed for the entire duration. At the end of crushing time rotations are stopped, piston is retrieved back. Powder is collected by cleaning the piston and cup with de-ionized water for further tests. This completes the crushing cycle.

The particles present in sample vary according to their mass, size, count, surface area etc. These particles are sorted into sections depending on it. The most common measurable property is the size of the particle. The particle size range varies between two range values in microns. The number of particles in each size range is counted. Particle size distribution (PSD) is the important factor to look at before sintering process. The particles which are subjected to high pressure and temperature need to be in a specific ratio depending on their size. Else might lead to formation of large pores after sintering, lowering the strength of the component. If the ratio of large and medium particle is high they do not pack together close enough leading to gaps. These gaps should be filled up by small size particles sealing the sample air tight. The most common method of quantity measurement is by laser diffraction, volume based technique. This technique determines the volume of particle of a particular particle size. [link ref]. These values are used to plot particle size distribution graph. X-axis represents the diameter in microns, Y-axis represents the frequency distribution of particles in each size range by percentile.

The particle size distribution is done by Electrozone sensing technique using Beckman-Coulter Multisizer III. Since the particle is present in a liquid, volume and diameter are measured by Coulter Principles. The minimum (5%), mean (50%), 95% and maximum (99.9%) size of the particles are determined before and after crushing. These values are put in the form of a table.

The Crushing Strength Index depends on the On-Size particles in starting powder (OSS), On-Size particles in the resulting powder (OSR). The cumulative percentile of particles between 50% and 95% of frequency distribution before crushing is OSS. The cumulative percentile of particles between 50% and 95% of frequency distribution after crushing is OSR. The Crushing Strength Index (CSI) is the ratio of On-size particles in resulting powder to On-size particles in starting powder.

CSI=(OSR/OSS)*100

To obtain precise value of CSI three trials are run on the sample determining 5%, 95% and CSI values for each trial. In addition to crushing strength fracture characteristics can also be determined by taking micrographs of the abrasive under SEM and FESEM before and after crushing.

RESULTS were provided from a sample of micron diamond powder. Powder treated by plasma/heat in an attempt to increase crushing strength and a sample was also tested. Sample designated S5902 was tested with the following techniques and shown in FIGS. 7A and 7B and displayed in the following table:

Particle Size Distribution
Crushing Strength Index

| FIG. 7A: Particle size distribution | | | | |
|---|---|---|---|---|
| | Diameter on % (μm) | | | |
| Sample | 5% | 50% | 95% | 99.9% |
| S5902 | 15.69 | 20.27 | 25.20 | 30.71 |
| 30879 | 14.82 | 19.95 | 25.10 | 30.58 |

| FIG. 7B: Crushing Strength Index (CSI) | | | | | | | |
|---|---|---|---|---|---|---|---|
| | Range, μm | | CSI | | | | Std |
| Sample | 50% | 95% | Trial1 | Trial2 | Trial3 | Average | dev |
| S5902 | 20.5 | 25.7 | 54.90% | 55.70% | 55.80% | 55.50% | 0.50% |

FIG. 8 shows the CSI average for all results from a calendar year.

Powder treated by plasma/heat in an attempt to increase crushing strength. 2 samples were tested:
1 sample designated as S5902
2 sample designated as S5926
They were tested with the following techniques and shown in FIGS. 8A, 8B and 8C and the following Table:
Particle Size Distribution
Crushing Strength Index

| FIG. 8A: Particle Size Distribution | | | | |
|---|---|---|---|---|
| | Diameter on % (μm) | | | |
| Sample | 5% | 50% | 95% | 99.9% |
| S5902 | 15.69 | 20.27 | 25.20 | 30.71 |
| S5926 | 15.56 | 20.29 | 25.37 | 32.02 |
| 30879 | 15.10 | 20.08 | 25.13 | 31.75 |

| FIG. 8B: Crushing Strength Index- S5902 | | | | | | | |
|---|---|---|---|---|---|---|---|
| | Range, μm | | CSI | | | | Std |
| Sample | 50% | 95% | Trial1 | Trial2 | Trial3 | Average | dev |
| S5902 | 20.5 | 25.7 | 54.90% | 55.70% | 55.80% | 55.50% | 0.50% |

| FIG. 8C: Crushing Strength Index- S5926 | | | | | | | |
|---|---|---|---|---|---|---|---|
| | Range, μm | | CSI | | | | Std |
| Sample | 50% | 95% | Trial1 | Trial2 | Trial3 | Average | dev |
| S5926 | 20.5 | 25.5 | 52.90% | 53.30% | 51.50% | 52.50% | 0.90% |

FIG. 9 shows graphic representation of average testing results for a calendar year for a second sample of treated diamond powder with respect to Crushing Strength Index.
FIG. 10
the first bar to the left is a reference, the un-treated sample; sample 4/3/2013, H, pressure 250 mTorr, 1.2 kV, 0.85 A, negative polarity, 20 minutes;

sample 4/4/2013, H, pressure 228 mTorr, 0.5 kV, 1 A, negative polarity, 25 minutes;
sample 4/30/2013, He, 0.26 mBar, 100 W, 3 hrs;
sample 5/1/2013, He, 0.3 mBar, 100 W, 8 hrs;
sample 5/2/2013a, He, 0.6 mBar, 100 W, 4 hr;
sample 5/2/2013b, H, 0.6 mBar, 100 W, 2.5 hr;
sample 5/3/2013a, H, 0.1 mBar, 100 W, 4 hrs,
sample 5/3/2013b, H, 0.3 mBar, 100 W, 6 hrs,
note: 1 millibar=0.750061683 torr As can be seen from this data, the level of vacuum within the system as well as the time duration of the treatment has an impact on the results. This can be expressed at various different ranges such as less than 300 Torr during treatment for at least 15 minutes, or at least (that is no higher pressure than) 0.5 mBar for 5 hours. The first range is estimated at producing best results, with almost a 30% increase in crushing strength, while the second range is able to display at least 8% increase in crushing strength. It is hypothesized that the lower pressures draw gases out from interstitial cracks and allow the resealing of edges to better occur.

What is claimed:

1. A method of altering physical properties of a diamond comprising:
   providing a diamond with defects;
   applying a cationic elemental plasma to the diamond at a plasma temperature of less than 300° C. and a pressure less than 300 millitorr; and
   allowing the cationic elemental plasma to chemically bond with atoms in defects within the diamond;
   thereby increasing the crushing strength index of the diamond by at least 5%.

2. The method of claim 1, wherein the plasma is applied at a pressure no higher than 250 millitorr for at least five hours.

3. The method of claim 1, wherein the cationic elemental plasma is selected from the group consisting of as $H^+$, $Na^+$, $Li^+$ and $K^+$.

4. The method of claim 3, wherein at least some plasma elemental cations form a covalent bond with carbon in the diamond.

5. The method of claim 4, wherein at least some of the covalent bonds are formed along fault lines, dislocations, occlusions or inclusions within the diamond.

6. The method of claim 3, wherein the plasma is at a temperature below 100° C.

7. The method of claim 1, wherein no plasma is projected from a source directly at the diamond.

8. The method of claim 7, wherein at least some plasma elemental cations form a covalent bond with carbon in the diamond.

9. The method of claim 7, wherein at least some plasma elemental cations form a covalent bond with carbon in the diamond and thereby strengthen the diamond.

10. The method of claim 9, wherein the plasma is at a temperature below 200° C.

11. The method of claim 9 wherein the plasma is at a temperature below 100° C.

12. The method of claim 1, wherein the plasma is provided as an environment surrounding the diamond.

13. The method of claim 1, wherein at least some plasma elemental cations form a covalent bond with carbon in the diamond and thereby strengthen the diamond.

14. The method of claim 1, wherein the plasma is at a temperature below 200° C.

15. The method of claim 1, wherein the diamond is a powder.

16. The method of claim 1, wherein the diamond has an average diameter of 5 µm to 2 mm.

17. A method of altering physical properties of a diamond comprising:
   providing a diamond powder with defects;
   applying a cationic elemental plasma to the diamond powder at a plasma temperature of less than 300° C. and a pressure less than 300 millitorr; and
   allowing the cationic elemental plasma to chemically bond with atoms in defects within the diamond powder,
   thereby increasing the crushing strength index of the diamond powder.

18. The method according to claim 17, wherein the diamond powder is vibrated during the application of the cationic elemental plasma.

* * * * *